US011462981B2

(12) United States Patent
Abdou (10) Patent No.: US 11,462,981 B2
(45) Date of Patent: Oct. 4, 2022

(54) ELECTRIC MOTOR

(71) Applicant: Hossam Abdou, Toronto (CA)

(72) Inventor: Hossam Abdou, Toronto (CA)

(*) Notice: Subject to any disclaimer, the term of this patent is extended or adjusted under 35 U.S.C. 154(b) by 140 days.

(21) Appl. No.: 16/554,571

(22) Filed: Aug. 28, 2019

(65) Prior Publication Data
US 2021/0067015 A1 Mar. 4, 2021

(51) Int. Cl.
| H02K 16/04 | (2006.01) |
|---|---|
| H02K 15/16 | (2006.01) |
| H02K 17/04 | (2006.01) |
| H02K 26/00 | (2006.01) |

(52) U.S. Cl.
CPC .................. *H02K 16/04* (2013.01)

(58) Field of Classification Search
CPC ........ H02K 15/16; H02K 17/04; H02K 26/00; H02K 16/04
USPC ............. 310/114, 156.26, 264, 265, 154.01, 310/156.35, 156.37, 182, 225, 231
See application file for complete search history.

(56) References Cited

U.S. PATENT DOCUMENTS

| 3,993,036 A | 11/1976 | Tischler |
|---|---|---|
| 4,771,200 A | 9/1988 | Ritzinger |
| 5,323,080 A | 6/1994 | Shahamat et al. |
| 5,500,994 A | 3/1996 | Itaya |
| 5,828,148 A | 10/1998 | Niggemann et al. |
| 6,241,472 B1 | 6/2001 | Bosch et al. |
| 6,323,575 B1 * | 11/2001 | Devenyi ............... H02K 26/00 310/261.1 |
| 6,710,498 B1 | 3/2004 | Lee et al. |
| 7,719,159 B2 | 5/2010 | Petro et al. |
| 8,247,944 B2 | 8/2012 | Gebregergis et al. |
| 8,710,779 B2 | 4/2014 | Wyrembra |
| 2001/0017499 A1 | 8/2001 | Kaneko et al. |
| 2003/0173925 A1 | 9/2003 | Strobl et al. |
| 2003/0193258 A1 | 10/2003 | Reiter, Jr. et al. |
| 2005/0093391 A1 | 5/2005 | McMullen et al. |
| 2006/0006752 A1 | 1/2006 | Chen et al. |
| 2006/0214534 A1 | 9/2006 | Thomas |
| 2008/0029506 A1 | 2/2008 | Neal |
| 2008/0129135 A1 | 6/2008 | Chen et al. |
| 2009/0039730 A1 | 2/2009 | Hong et al. |
| 2009/0081340 A1 | 3/2009 | Forney |
| 2009/0091204 A1 | 4/2009 | Koshiba et al. |
| 2010/0225194 A1 | 9/2010 | Bahadir |

(Continued)

FOREIGN PATENT DOCUMENTS

| CA | 3018244 A1 | 10/2017 |
|---|---|---|
| DE | 2430006 A1 * | 1/1975 |

(Continued)

*Primary Examiner* — Jose A Gonzalez Quinones
(74) *Attorney, Agent, or Firm* — Im IP Law PLLC; Chai Im; C. Andrew Im (57) ABSTRACT

An electric motor includes a cylindrical rotor with a plurality of wires parallel to the cylindrical axis nested between two cylinders of magnets in a stator. The cylinders of magnets may be a solid magnet, a plurality of bar magnets, a plurality of coils generating magnetic fields or other magnets or generated magnetic fields. A nested electric motor includes a first electric motor additionally including a first shaft, which first electric motor nests within the hollow center of a second larger electric motor additionally including a second shaft. The first shaft is coaxial with the second shaft.

8 Claims, 9 Drawing Sheets

(56) References Cited

U.S. PATENT DOCUMENTS

| | | |
|---|---|---|
| 2011/0037352 A1 | 2/2011 | Lin et al. |
| 2011/0115326 A1 | 5/2011 | Clark et al. |
| 2012/0126731 A1 | 5/2012 | Wyrembra |
| 2013/0221781 A1 | 8/2013 | Nakayama et al. |

FOREIGN PATENT DOCUMENTS

| | | | | |
|---|---|---|---|---|
| DE | 10260846 A1 | * | 7/2004 | ............. H01R 39/32 |
| FR | 2624669 A | * | 6/1989 | |
| WO | WO-2020173526 A1 | * | 9/2020 | ............. H02K 16/02 |

* cited by examiner

ELECTRIC MOTOR

FIELD OF THE INVENTION

The present invention relates to electric motors and more particularly to an electric motor comprising a cylindrical rotor with a plurality of wires parallel to the cylindrical axis nested between two cylinders of magnets in a stator and also to electric motors nested one within the other with coaxial shafts.

BACKGROUND OF THE INVENTION

Electric motors convert electrical energy into mechanical energy and typically comprise a stator and a rotor. The stator is the stationary part of the motor's electromagnetic circuit and usually consists of either magnets or windings. The rotor is the moving part of the motor which rotates due to the interaction between the windings and magnetic fields which produces a torque around the rotor's axis. In an A.C. motor, a commutator applies electric current to the windings which leads to the production of a steady rotating force. Electric motors can be used in a variety of applications, including, but not limited to, electric cars, aviation, robotics, and as a stand-alone motor. Electric motors may also be used to convert mechanical energy into electrical energy and when used for this purpose they are referred to as electric generators.

In U.S. Pat. No. 7,719,159 issued May 18, 2010, a series of housing structures each supporting field pole members and configured to mate with one another form an enclosure of an electrodynamic machine. Each field pole member may have a first pole face and a second pole face. Also, the members each can have a field pole core being configured to produce a flux path in a direction from the first pole face to the second pole face.

In U.S. Pat. No. 8,710,779 issued Apr. 29, 2014, an electric motor is described having at least two stators disposed coaxially to each other and a rotor, wherein each stator has 2*n poles with n=1, 2, 3, . . . , each stator has at least one common coil or winding for all poles, each stator has a first and second partial shell, each partial shell has a shell bottom and n poles, each pole is formed as a tooth extending in axial direction or substantially in axial direction and beginning on the shell bottom, wherein when assembled partial shells of a stator the tooth or the teeth of the first partial shell is or are disposed in alternating manner in circumferential direction with the tooth or the teeth of the second partial shell, and wherein with assembled partial shells or a stator, the at least one coil) or winding is received between the partial shells.

U.S. Pat. No. 8,247,944 issued Aug. 21, 2012 describes brushed DC electric motors using a plurality of brushes for energizing the windings in the rotor of the motor. The method described is to reduce torque ripple in brushed DC electric motors by positioning each brush in a pocket with inter alia a spring and a damper.

U.S. Pat. No. 5,500,994 issued Mar. 26, 1996 discloses a method of manufacturing a rotor to address the demand for a miniature electric motor with high torque power, and power saving. The method of manufacture aims to reduce cost of materials, the weight, and the separation or cracks of the magnetic layer of the rotor. Other electric motors have reduced weight through changing the type of material used in the motor.

It is desirable to have a lightweight brushed DC electric motor that saves space while also offering high performance with a smooth torque curve.

SUMMARY OF THE INVENTION

The present invention is an electric motor comprising a cylindrical rotor with a plurality of wires parallel to the cylindrical axis nested between two cylinders of magnets in a stator.

The two cylinders of magnets may be a solid magnet, a plurality of bar magnets or a plurality of coils generating magnetic fields or other magnets or generated magnetic fields.

A nested electric motor comprises a first electric motor additionally comprising a first shaft, which first electric motor nests within the hollow centre of a second larger electric motor additionally comprising a second shaft and wherein the first shaft is coaxial with the second shaft.

A nested electric motor comprising a first electric motor with a first shaft, which first electric motor nests within the hollow centre of a second larger electric motor with a second shaft and wherein the first shaft is coaxial with the second shaft, and wherein the second electric motor comprises a cylindrical rotor with a plurality of wires parallel to the cylindrical axis nested between two cylinders of magnets in a stator.

BRIEF DESCRIPTION OF THE FIGURES

These and other aspects of the present invention will be apparent from the brief description of the drawings and the following detailed description in which.

DETAILED DESCRIPTION OF THE INVENTION

The present invention is an electric motor comprising a cylindrical rotor with a plurality of wires parallel to the cylindrical axis nested between two cylinders of magnets (either a solid magnet or plurality of magnets). In a further embodiment of the present invention an electric motor of the present invention is nested in the centre of a larger electric motor of the present invention and the respective shafts 90 are coaxial. In a further embodiment of the present invention an electric motor of any type is nested in the centre of a larger electric motor of the present invention and the respective shafts 90 are coaxial.

Figure 1:
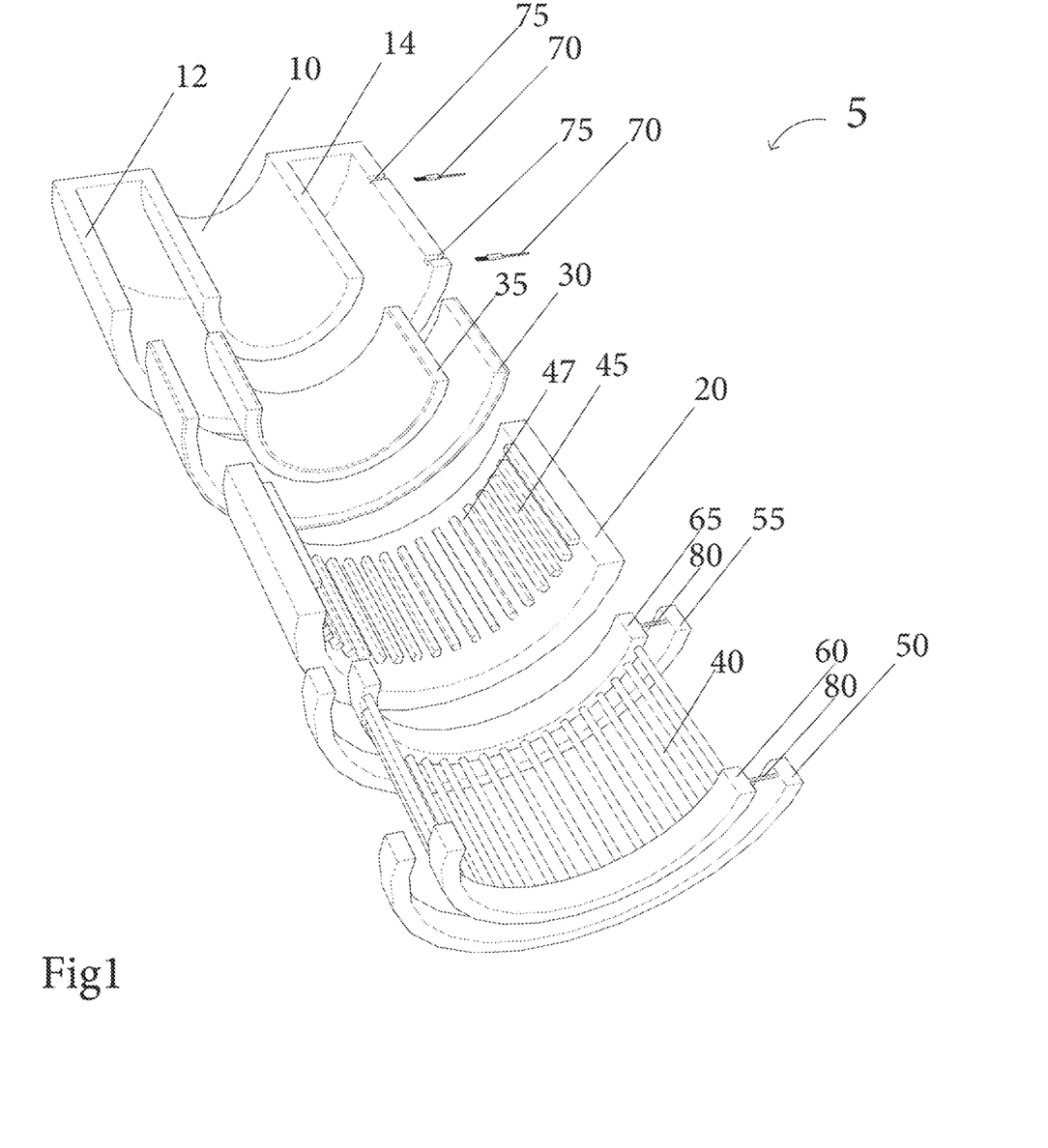
FIG. 1 is an exploded perspective horizontal cross-sectional view of an embodiment of an electric motor of the present invention with cylindrical magnets.
Figure 2:
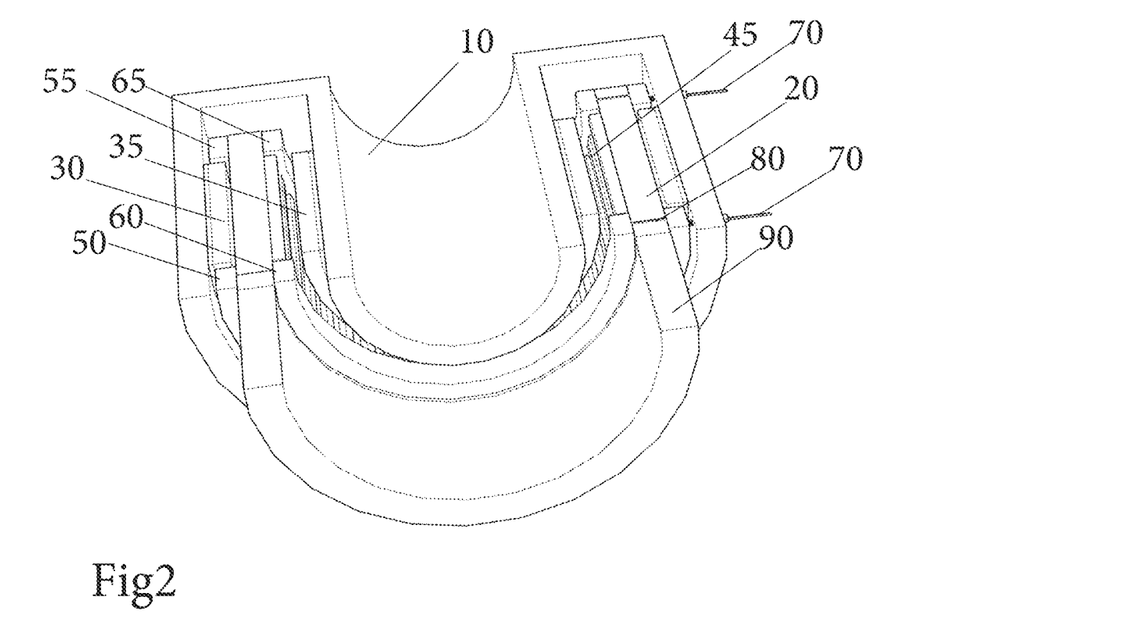
FIG. 2 is a perspective horizontal cross-sectional view of an embodiment of the present invention with cylindrical magnets.
Figure 3:
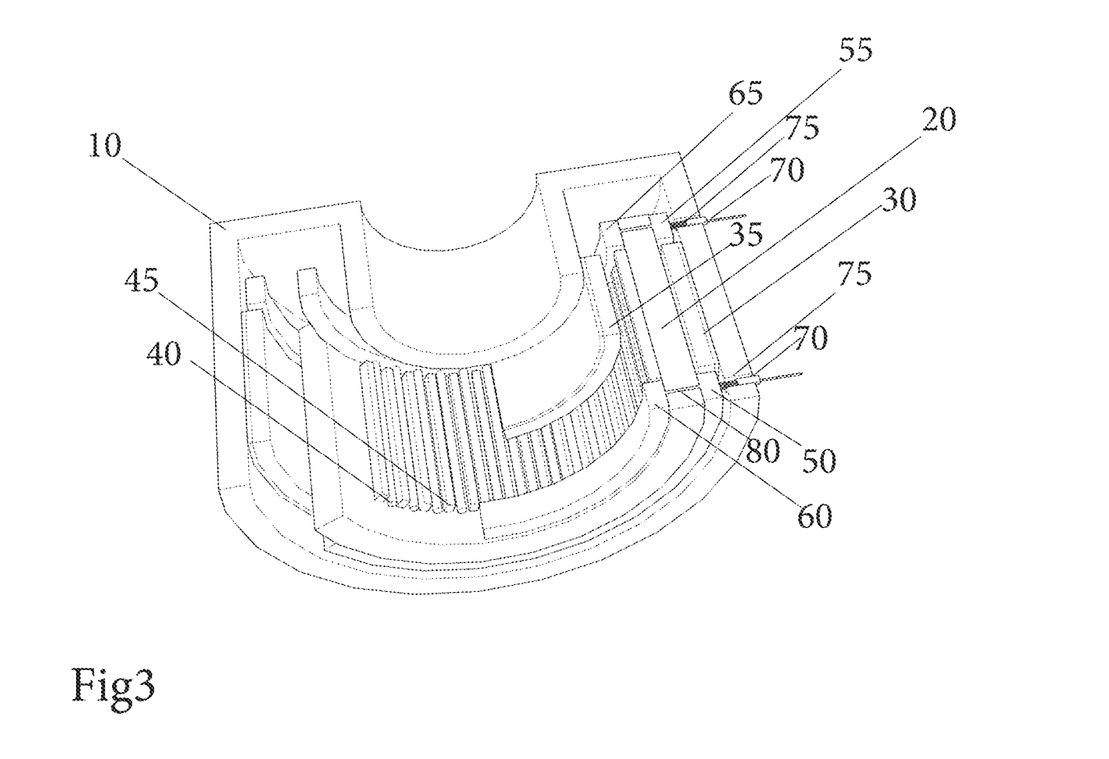
FIG. 3 is a cut away perspective horizontal cross-sectional view of an embodiment of the present invention with cylindrical magnets.
Figure 4:
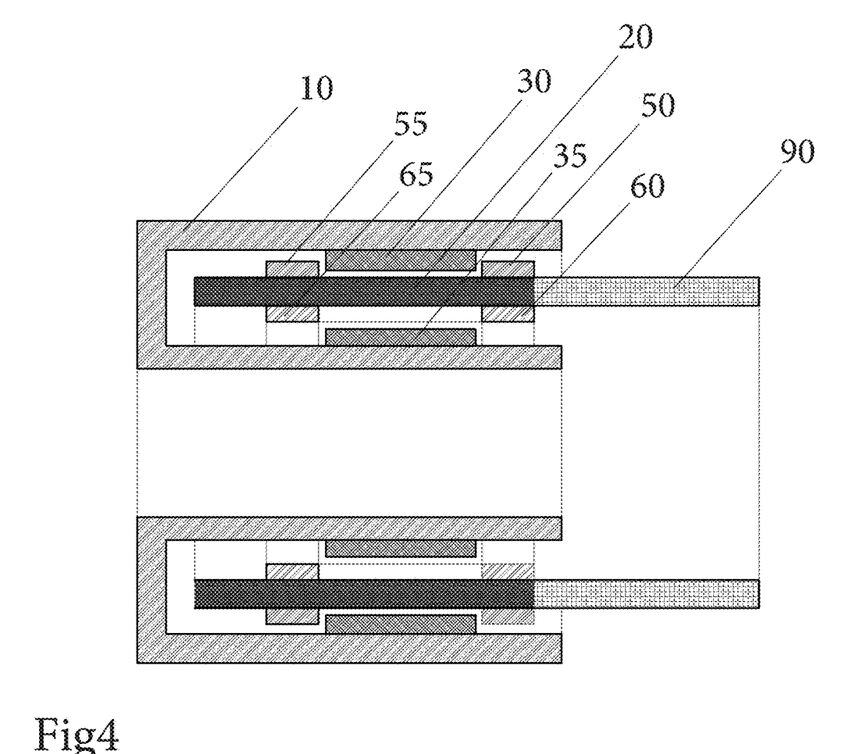
FIG. 4 is a side cross-sectional view of an embodiment of the present invention with cylindrical magnets.
Figure 5:
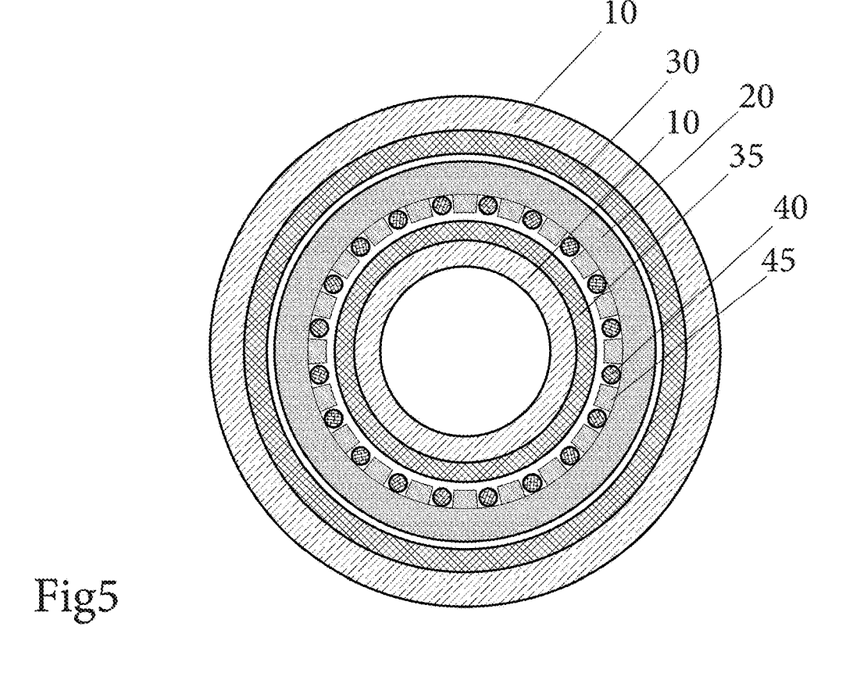
FIG. 5 is a vertical cross-sectional view of an embodiment of the present invention with cylindrical magnets.
Figure 6:
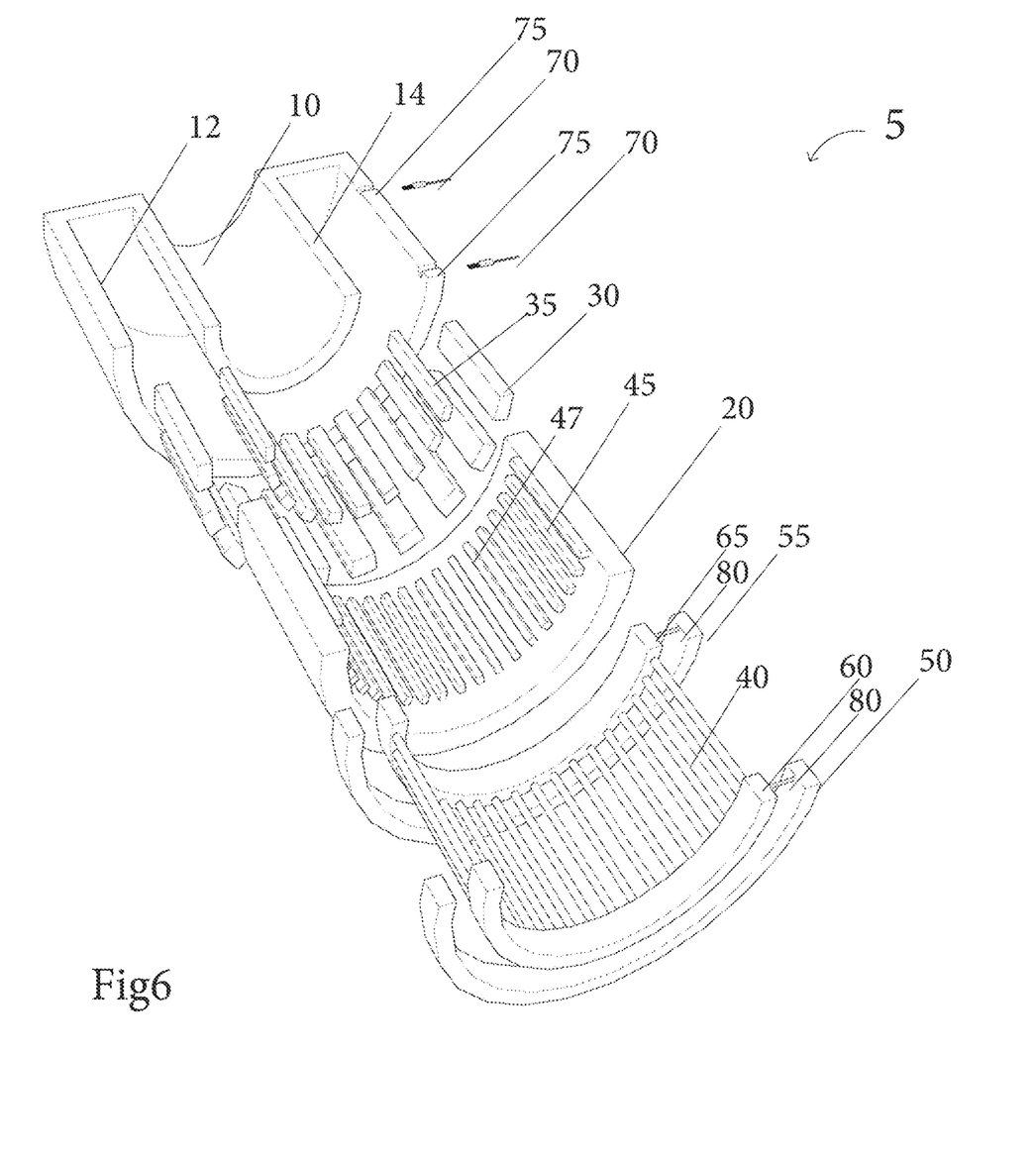
FIG. 6 is an exploded perspective horizontal cross-sectional view of an embodiment of an electric motor of the present invention with bar magnets.
Figure 7:
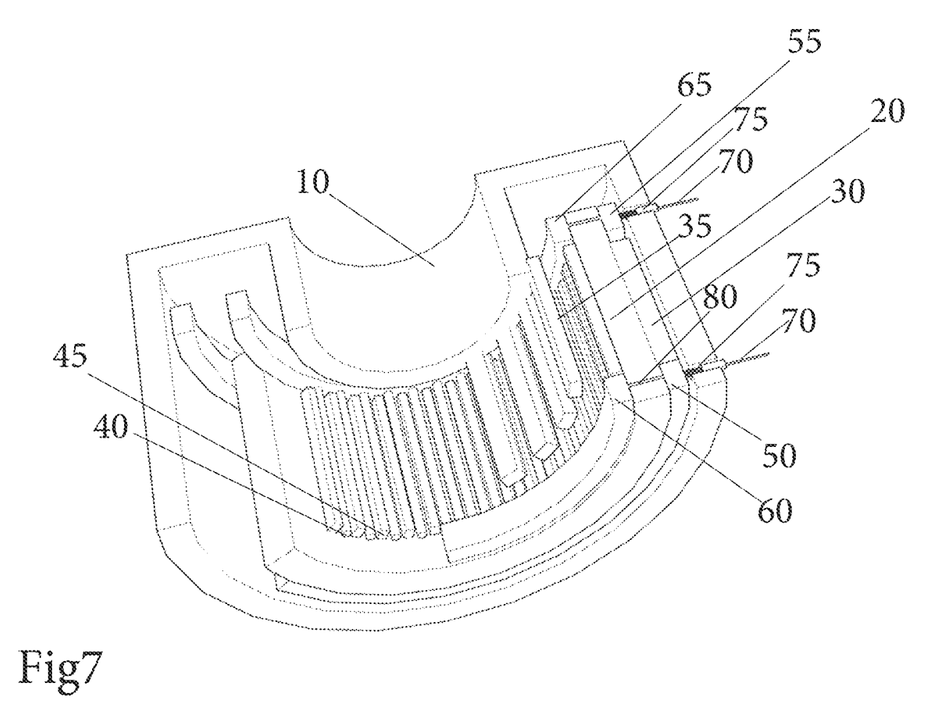
FIG. 7 is a cut away perspective horizontal cross-sectional view of an embodiment of the present invention with bar magnets.
Figure 8:
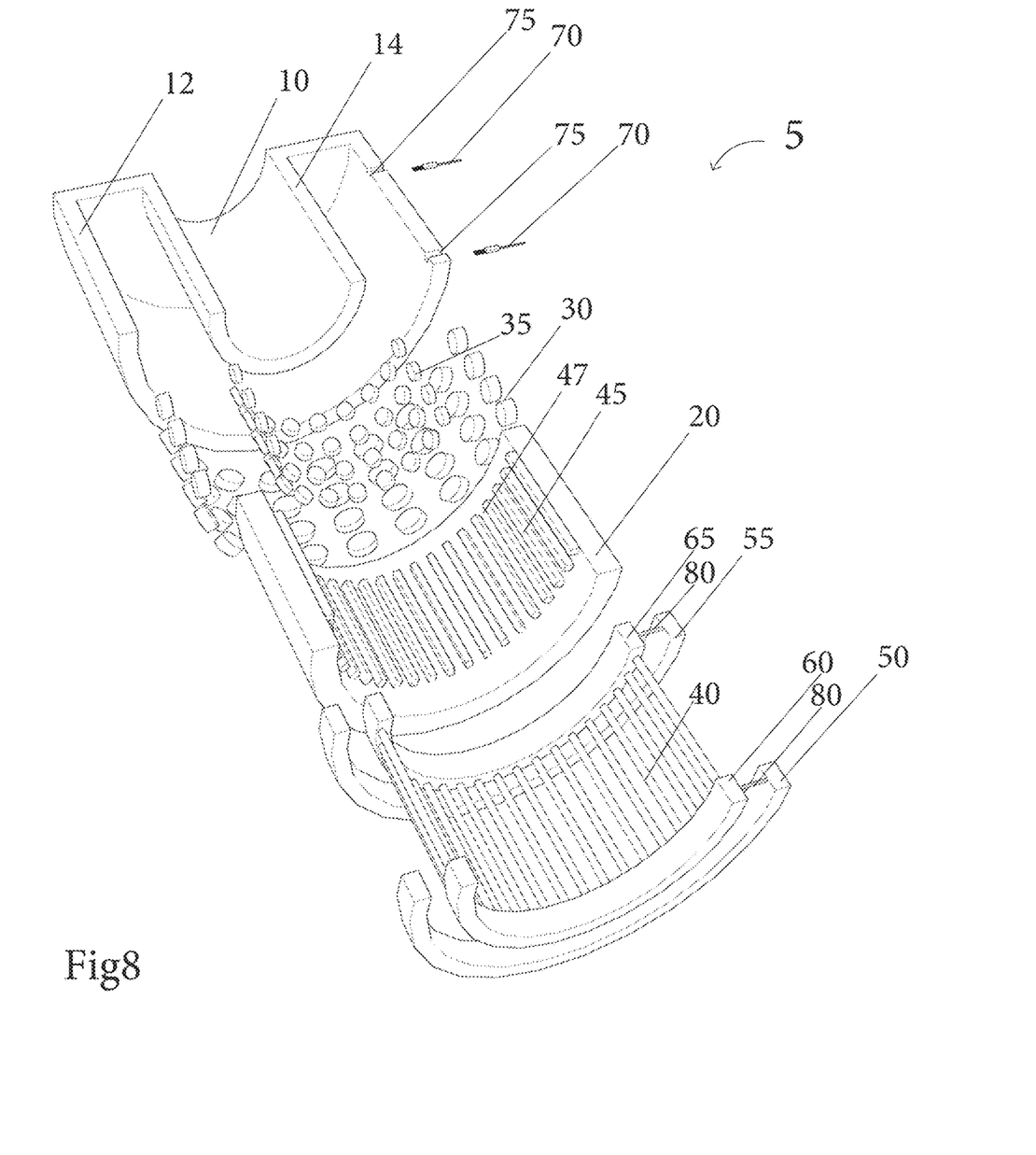
FIG. 8 is an exploded perspective horizontal cross-sectional view of an embodiment of an electric motor of the present invention with coils generating magnetic fields.
Figure 9:
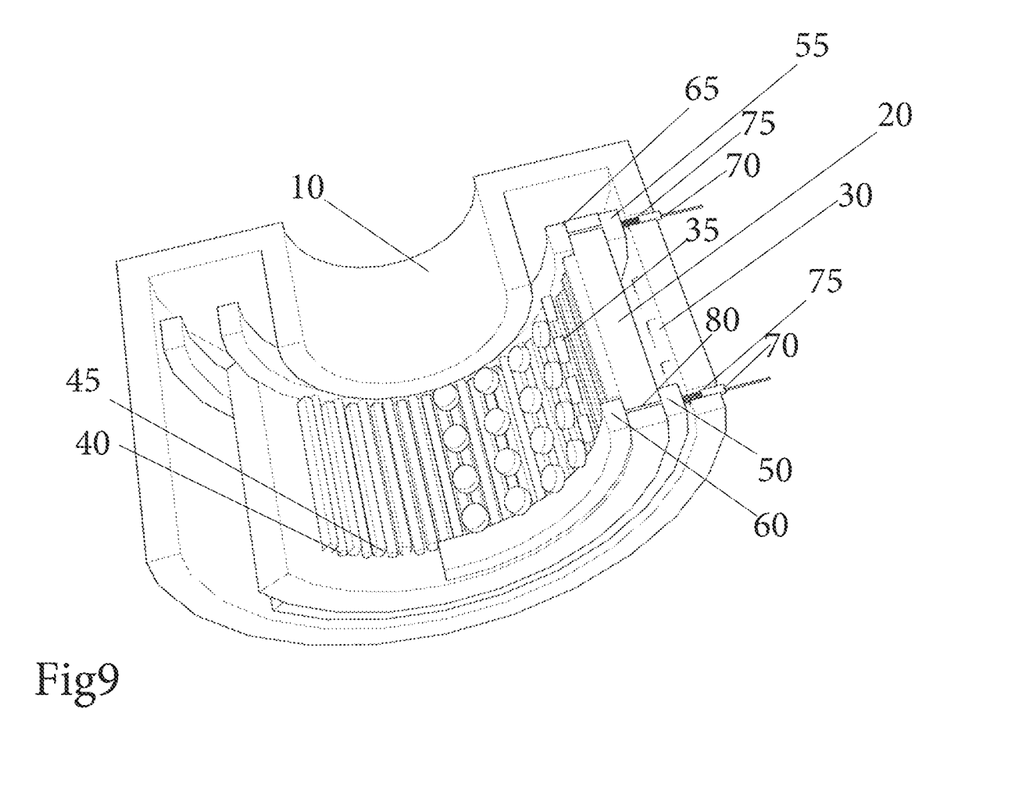
FIG. 9 is a cut away perspective horizontal cross-sectional view of an embodiment of the present invention with coils generating magnetic fields.
Figure 10:
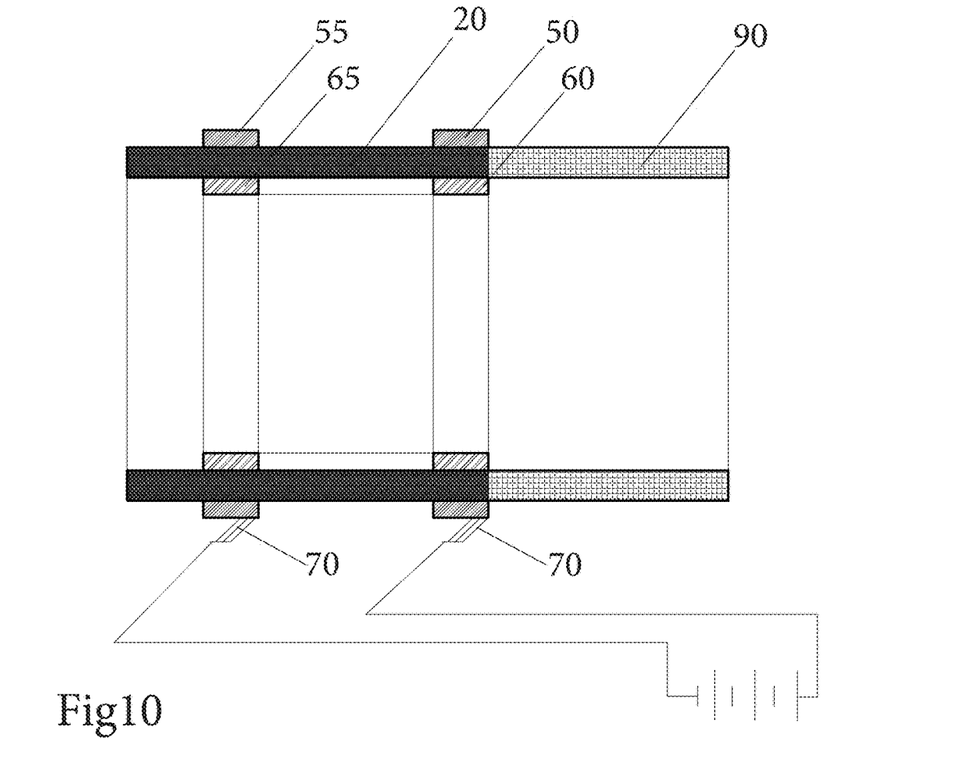
FIG. 10 is a side cross-sectional view of an embodiment of the rotor with shaft of the present invention.
Figure 11:
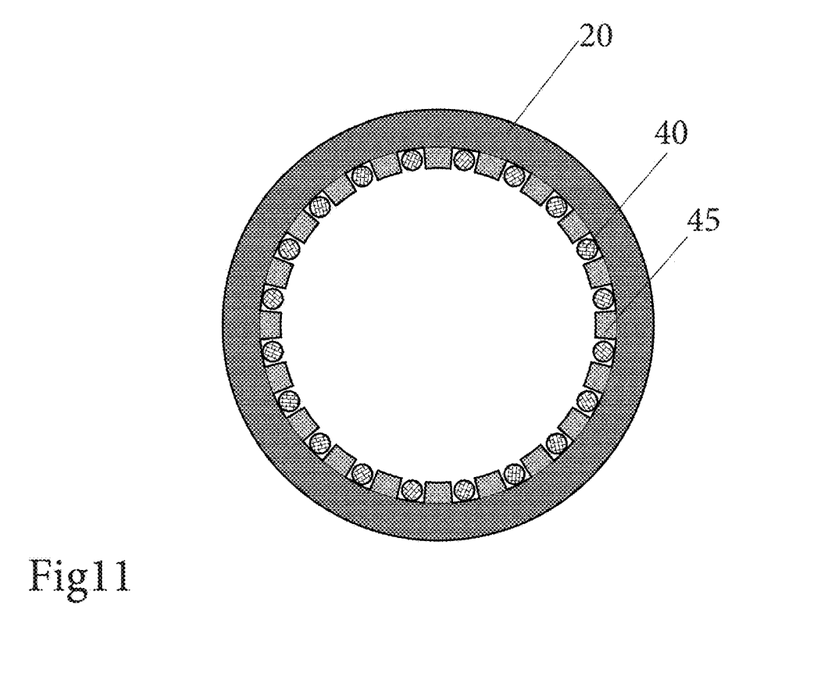
FIG. 11 is a vertical cross-sectional view of an embodiment of the rotor of the present invention.
Figure 12:
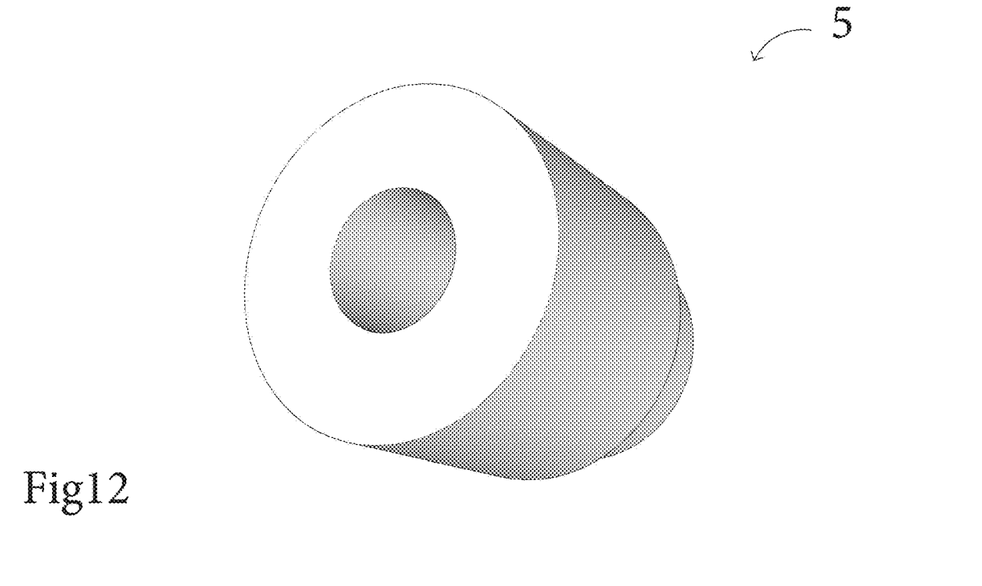
FIG. 12 is a back perspective view of an embodiment of an electric motor of the present invention.
Figure 13:
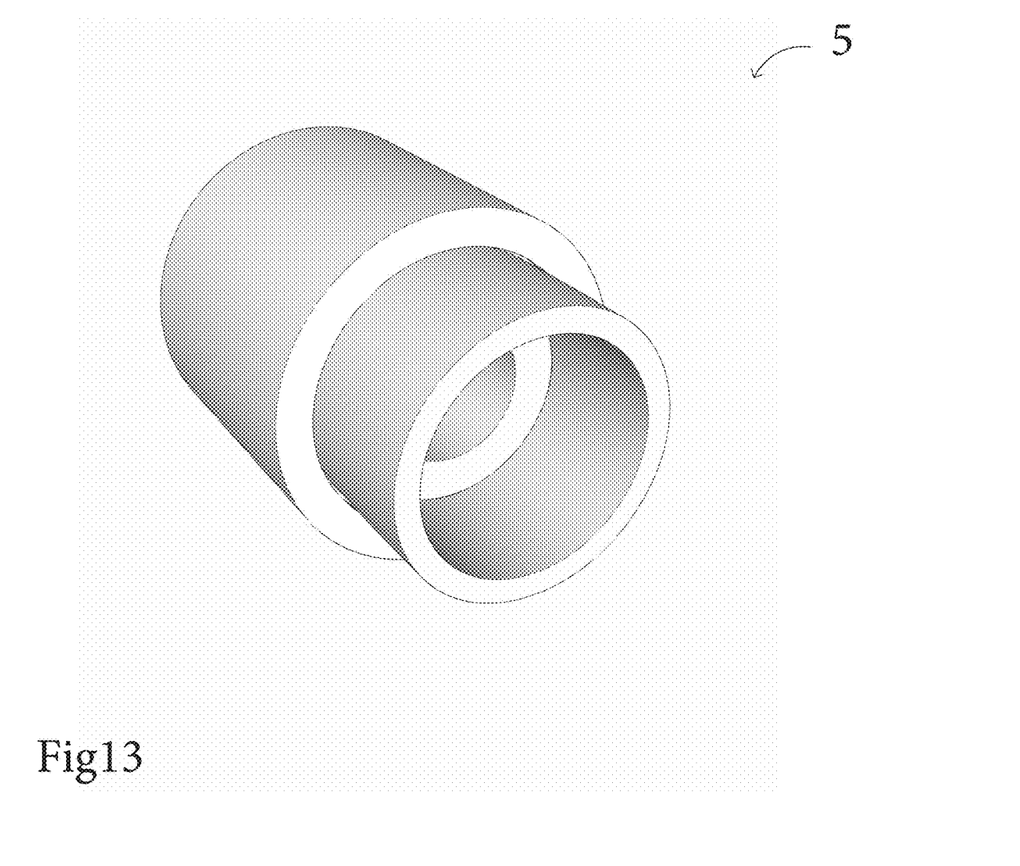
FIG. 13 is a front perspective view of an embodiment of an electric motor of the present invention.

FIGS. 1-5 show an embodiment of the electric motor of the present invention with a solid cylindrical magnet. FIGS. 6 and 7 show an embodiment of the electric motor of the present invention with a plurality of bar magnets in a cylinder shape and FIGS. 8 and 9 show an embodiment of the electric motor of the present invention with a plurality of coils generating magnetic fields in a cylinder shape. FIGS. 10 and 11 show a rotor of the present invention.

The stator comprises a stator body 10 comprising a double walled ring having an outer circular wall 12 and an inner circular wall 14 with an open first end and a closed second end. The stator body 10 houses an outer circular coil magnet 30 adjacent the outer circular wall and an inner circular coil magnet 35 adjacent to the inner circular wall 14. The inner magnet 35 is substantially concentric with the outer magnet 30. The magnets may be fixed in any way as in existing electric motors, for example the coils could each have a strip and two screws.

The rotor comprises a ring-shaped rotor body 20 and rotor wiring. The rotor body 20 has a first end and second end between which are a plurality of parallel linear protrusions 45 forming wiring slots 47 in between. The rotor wiring comprises a plurality of parallel linear wires 40 having an upper inner ring 60 affixing the first end of the wires 40 and a lower inner ring 65 affixing the second end of the wires 40. The upper inner ring 60 is connected to an upper outer ring 50 by a ring wire 80 and the lower inner ring 65 is connected to a lower outer ring 55 by a ring wire 80. Each individual wire of the wires 40 fit in one of the wiring slots 47 and the rotor body nests within the upper outer ring 50 and upper inner ring 60 at a first end of the rotor body and between a lower outer ring 55 and a lower inner ring 65 at a second end of the rotor body. The rotor nests in between the outer magnet 30 and inner magnet 35. An open cylindrical shaft 90 is at the end of the rotor body 20. The shaft 90 can be attached as with existing electric motors, for example by welding.

The upper outer ring 50 and lower outer ring 55 each have a brush channel 75. Brushes 70 extend through the brush channels 75 and are connected to the ring wires 80 and the brushes 70 are connected to DC power source terminals (not shown), providing electrical feed.

In a further embodiment of the invention, an electric motor (either of the present invention or another electric motor) is nested within the hollow centre of a larger electric motor of the present invention and the two electric motors' respective shafts 90 are coaxial.

A nested electric motor with two motors of the current invention comprises a first electric motor with a first shaft 90, which first electric motor nests within the hollow centre of a second larger electric motor with a second shaft 90, wherein the first shaft 90 is coaxial with the second shaft 90.

In an embodiment of the nested electric motor 5 of the present invention, the motor is made from plastic and iron and any ferrite material, although it is understood that the motor may be made from any materials known in the art or suitable for an electric motor.

The electric motor of the present invention may be used in electric cars, aviation, robotics, stand alone and other applications.

While embodiments of the invention have been described in the detailed description, the scope of the claims should not be limited by the preferred embodiments set forth in the examples but should be given the broadest interpretation consistent with the description as a whole.

The invention claimed is:

1. A nested electric motor comprising a first cylindrical electric motor and a second cylindrical electric motor, wherein each cylindrical electric motor has a hollow center, and comprises:
    a cylindrical stator body;
    a cylindrical rotor;
    a plurality of parallel wires running parallel to the cylindrical axis of the electric motor;
    an outer magnet; and
    an inner magnet;
    wherein the cylindrical stator body is a double walled tube having an outer cylindrical wall and an inner cylindrical wall with an open end and a closed end;
    wherein the outer magnet, the cylindrical rotor, the plurality of parallel wires and the inner magnet rest cylindrically in order between the outer cylindrical wall and the inner cylindrical wall; and
    wherein the second cylindrical electric motor is larger than the first cylindrical electric motor and the first cylindrical electric motor nests within the hollow center of the second cylindrical electric motor.

2. The nested electric motor of claim 1, wherein the first cylindrical electric motor comprises a first shaft attached to the cylindrical rotor of the first cylindrical electric motor at the open end of the cylindrical stator body of the first cylindrical electric motor, wherein the second cylindrical electric motor comprises a second shaft attached to the cylindrical rotor of the second cylindrical electric motor at the open end of the cylindrical stator body of the second cylindrical electric motor, and wherein the first shaft is coaxial with the second shaft.

3. A cylindrical electric motor with a hollow center, said electric motor comprising:
    a cylindrical stator body comprising a double walled tube having an outer cylindrical wall and an inner cylindrical wall with an open end and a closed end;
    a cylindrical rotor;
    a plurality of parallel wires running parallel to the cylindrical axis of the electric motor;
    an outer magnet;
    an inner magnet;
    an upper outer ring adjacent the outer magnet at the open end of the cylindrical stator body and a lower outer ring adjacent the outer magnet at the closed end of the cylindrical stator body;
    an upper inner ring is connected to the upper outer ring by an upper ring wire, and a lower inner ring is connected to the lower outer ring by a lower ring wire;
    wherein the outer magnet, the cylindrical rotor, the plurality of parallel wires and the inner magnet rest cylindrically in order between the outer cylindrical wall and the inner cylindrical wall;

wherein the cylindrical rotor comprises a plurality of parallel protrusions forming slots therebetween and the plurality of parallel wires are in the slots between the plurality of parallel protrusions; and wherein the plurality of parallel wires has a first end at the open end of the cylindrical stator body and a second end at the closed end of the cylindrical stator body, and the first end of the plurality of parallel wires is affixed to the upper inner ring and the second end of the plurality of parallel wires is affixed to a lower inner ring.

4. The electric motor of claim 3, further comprising an upper brush channel through which an upper brush extends to connect to the upper ring wire, and a lower brush channel through which a lower brush extends to connect to the lower ring wire.

5. The electric motor of claim 4, further comprising a shaft attached to the cylindrical rotor at the open end of the cylindrical stator body.

6. A nested electric motor, comprising a first cylindrical electric motor with a hollow center and a second cylindrical electric motor with a hollow center, wherein each of said cylindrical electric motors comprise:
 a cylindrical stator body;
 a cylindrical rotor having a plurality of protrusions parallel to a cylindrical axis of the respective cylindrical electric motor, and slots between the plurality of protrusions;
 a plurality of parallel wires running parallel to the cylindrical axis and resting in said slots;
 an outer magnet; and
 an inner magnet;
 wherein the cylindrical stator body is a double walled tube having an outer cylindrical wall and an inner cylindrical wall with an open end and a closed end;
 wherein the outer magnet, the rotor, the plurality of parallel wires and the inner magnet resting cylindrically in order between the outer cylindrical wall and the inner cylindrical wall; and
 wherein the second cylindrical electric motor is larger than the first cylindrical electric motor, and the first cylindrical electric motor nests within the hollow center of the second cylindrical electric motor.

7. The nested electric motor of claim 6, wherein the first cylindrical electric motor further comprises a first shaft attached to the cylindrical rotor of the first cylindrical electric motor at the open end of the cylindrical stator body of the first cylindrical electric moto; wherein the second cylindrical electric motor further comprises a second shaft attached to the cylindrical rotor of the second cylindrical electric motor at the open end of the cylindrical stator body of the second cylindrical electric motor; and wherein the first shaft is coaxial with the second shaft.

8. The electric motor of claim 3, further comprising a shaft attached to the cylindrical rotor at the open end of the cylindrical stator body.

\* \* \* \* \*